Aug. 23, 1966   B. H. COWBURN   3,267,729
COMPENSATING DEVICE FOR GAS FLOWMETERS
Filed Nov. 8, 1963   5 Sheets-Sheet 1
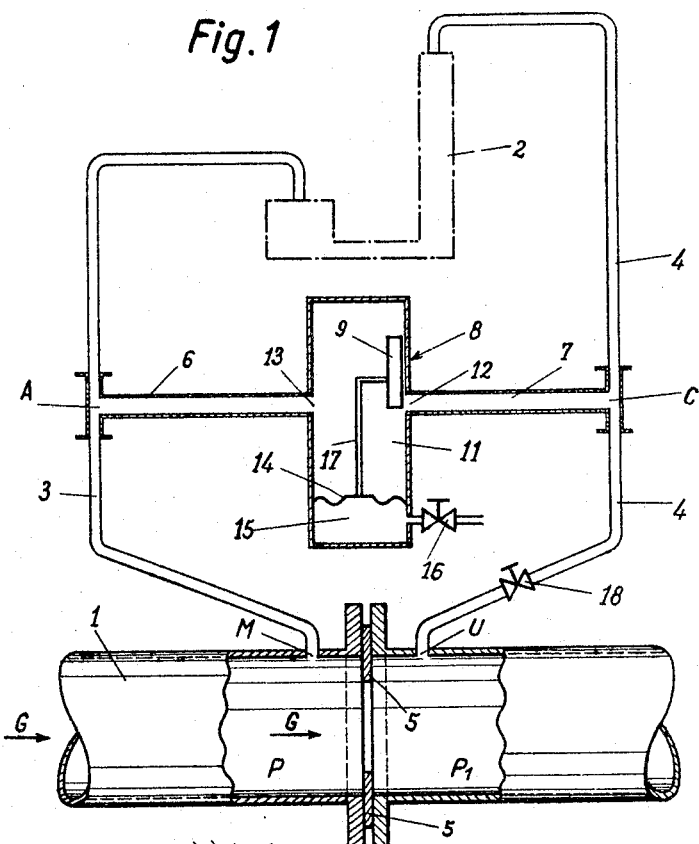
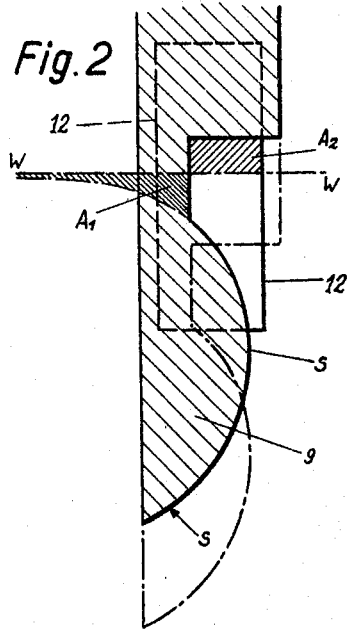
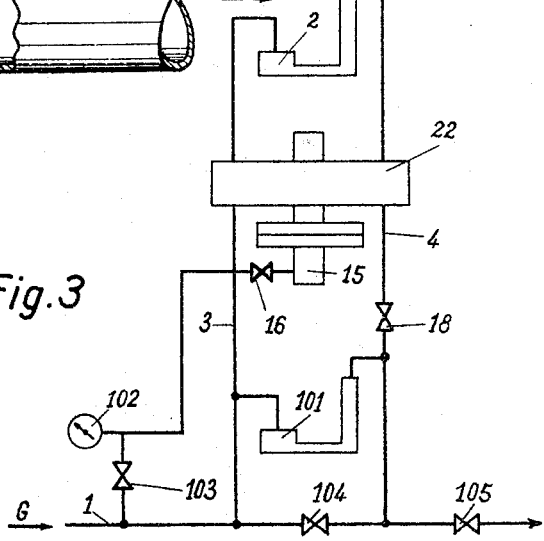
INVENTOR
BENJAMIN HODKINSON COWBURN
By Irwin S. Thompson
ATTY.

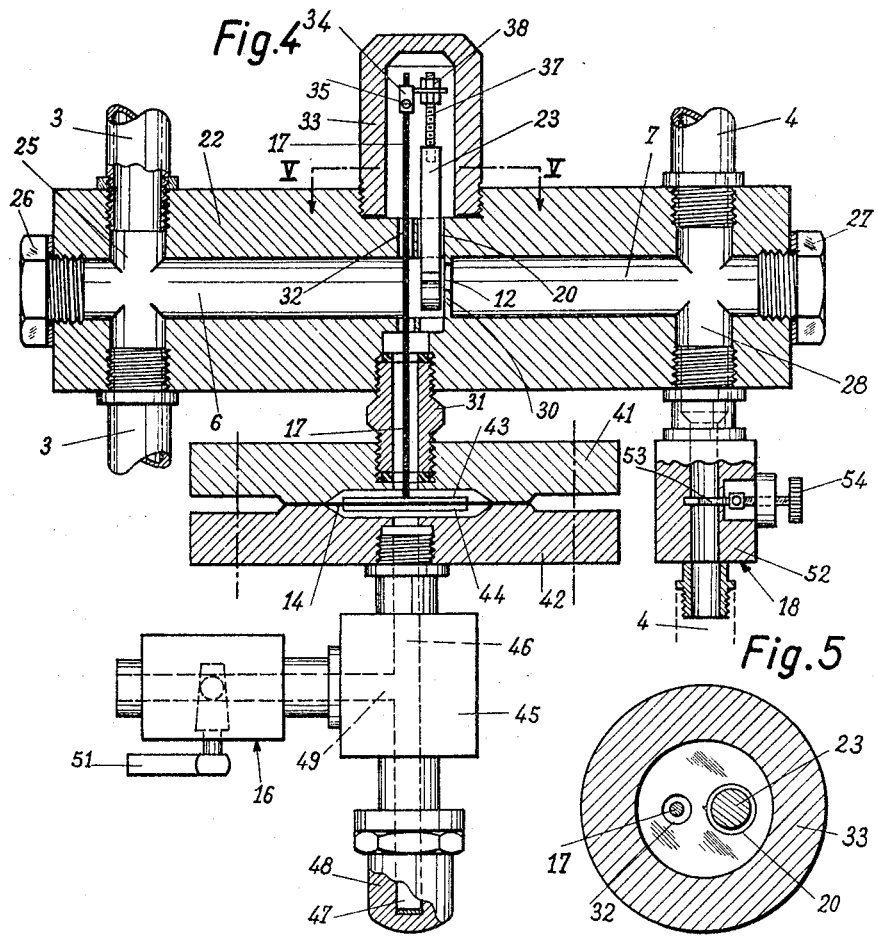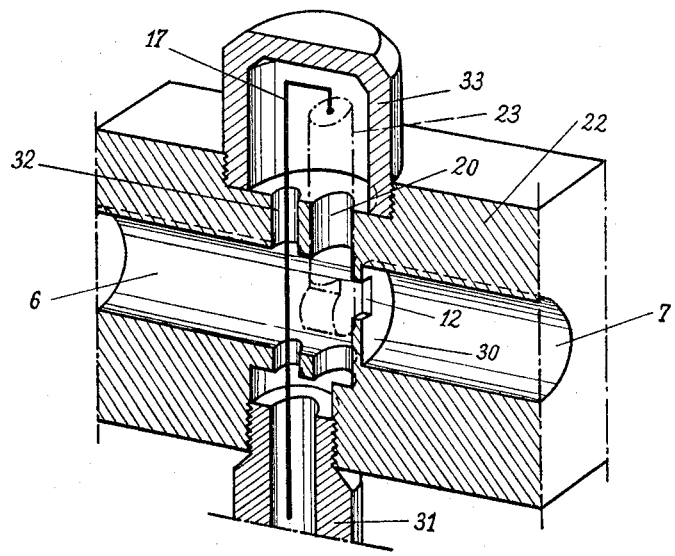

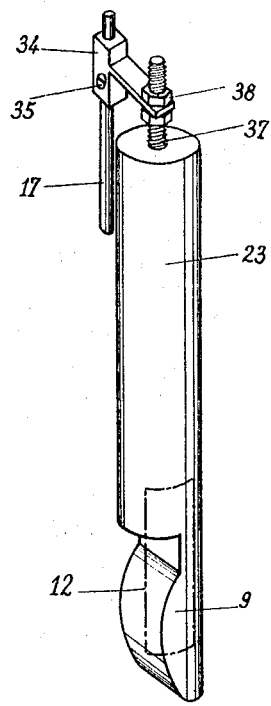
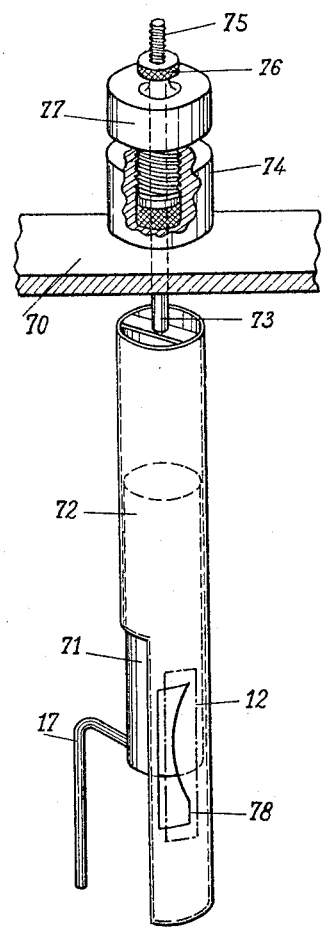

United States Patent Office 3,267,729
Patented August 23, 1966

3,267,729
COMPENSATING DEVICE FOR GAS FLOWMETERS
Benjamin Hodkinson Cowburn, 5 Rue Denfert-Rochereau,
Boulogne-sur-Seine, France
Filed Nov. 8, 1963, Ser. No. 322,483
Claims priority, application France, Nov. 15, 1962,
915,506, Patent 1,350,705
8 Claims. (Cl. 73—205)

The present invention concerns a compensating device applicable in particular to instruments which measure a pressure-drop created by a restrictive element placed in a pipe carrying a flow of gas or vapour, hereinafter referred to as gas.

The invention is suitable for use with gas flowmeters. Such instruments include a system for measuring a differential pressure and are connected to two taps, one on either side of a restriction such as an orifice-plate or nozzle installed in the pipe carrying the gas flow.

In such an arrangement, the differential pressure DP and the gas velocity V are related by the formula:

$$DP = K \cdot m \cdot V^2$$

K is a constant determined by the pipe and orifice,
$m$ is the specific mass of the gas.

As the flow $Q = A\sqrt{DP}$ (A being a constant) the flow is actually proportional to $\sqrt{m}$.

Now the measuring system connected to the taps will give correct readings only for the value of $m$ for which it has been calibrated.

If $m$ varies because of pressure or temperature changes, the readings will be incorrect.

For this reason, whenever mass-flow is to be read directly, that is to say flow corrected to standard temperature and pressure conditions, it is necessary to obtain signals corresponding to pressure and temperature in addition to the flow-signal and send all three to a computer which then provides a corrected flow-signal. This arrangement is costly and complicated.

It is therefore an object of the present invention to remedy this drawback by providing a compensating device for use with conventional flowmeters and which adjusts the differential pressure applied to them as required by the temperature and pressure variations of the process fluid.

A further object of the invention is providing compensation for the supercompressibility of gases, i.e. their deviation from Mariotte's law.

This latter object is one which precisely cannot be achieved even with arithmetical compensators such as are referred to above for, in order to simplify calculations, their design is based on the assumption that all gases behave as perfect gases, in other words that they conform to Mariotte's law, which, in fact, they frequently do not.

According to the invention, the compensating device for use with flowmeters connected across a pressure-reducing element placed in a pipe through which gas flows is chiefly characterized by having an automatically controlled throttle connected in parallel with the flowmeter, this throttle being controlled by a flexible diaphragm exposed to the upstream gas pressure and to the balancing pressure of a specific mass of gas confined in a reference chamber, the device also including a fixed but adjustable throttle in the downstream flowmeter connection, thus providing flow measurements which are corrected as the specific mass of the gas varies.

In a simplified version of the invention, the automatic throttle consists of a slide-valve fitted within a compartment connected to the upstream flowmeter connection, the slide moving over a port to the downstream flowmeter connection, and the compartment also containing the diaphragm which is rigidly linked to the slide and forms one side of the reference chamber.

Preferably, the working surface of the slide which moves over the port is of a shape determined by the theoretical compensation requirements.

In applications where the gas flow temperature remains close to room temperature, the reference chamber is placed outside the pipe and is provided with a cock for filling under controlled conditions.

In the opposite case, the compartment enclosing the slide-valve also contains a diaphragm rigidly linked to the slide and which covers a recess connected by a tube to a bulb fitted inside the main pipe, the volume thus enclosed being partially filled by a liquid, leaving in the upper part of the bulb a free space which can be filled through a cock with a sample of gas at controlled pressure and temperature, and it is this gas-filled space which constitutes the reference chamber whose changes of volume cause the corresponding movements of the diaphragm.

In all cases where the process gas does not obey Mariotte's law the invention provides for filling the reference chamber with a sample of this same process gas.

Other particularities of the invention will appear in the following description:

The appended drawings, which are provided as non-limiting examples, show various designs of the invention.

FIG. 1 is a diagrammatic cross-section of the first compensator actually built.

FIG. 2 is a diagram showing one particular design of the slide-valve in the open position.

FIG. 3 is a diagram of a test and calibration rig for the compensator.

FIG. 4 is a diametral cut-away cross-section of an industrial type of the compensating device built in accordance with the diagram in FIG. 1.

FIG. 5 is a sectional view across V—V of FIG. 4.

FIG. 6 is an isometric view of a part of the cross-section shown on FIG. 4.

FIG. 7 is an isometric diagram of the slide-valve in the above arrangement.

FIG. 10 is an isometric diagram similar to FIG. 7 but showing an alternative design for the slide-valve.

Figure 8:
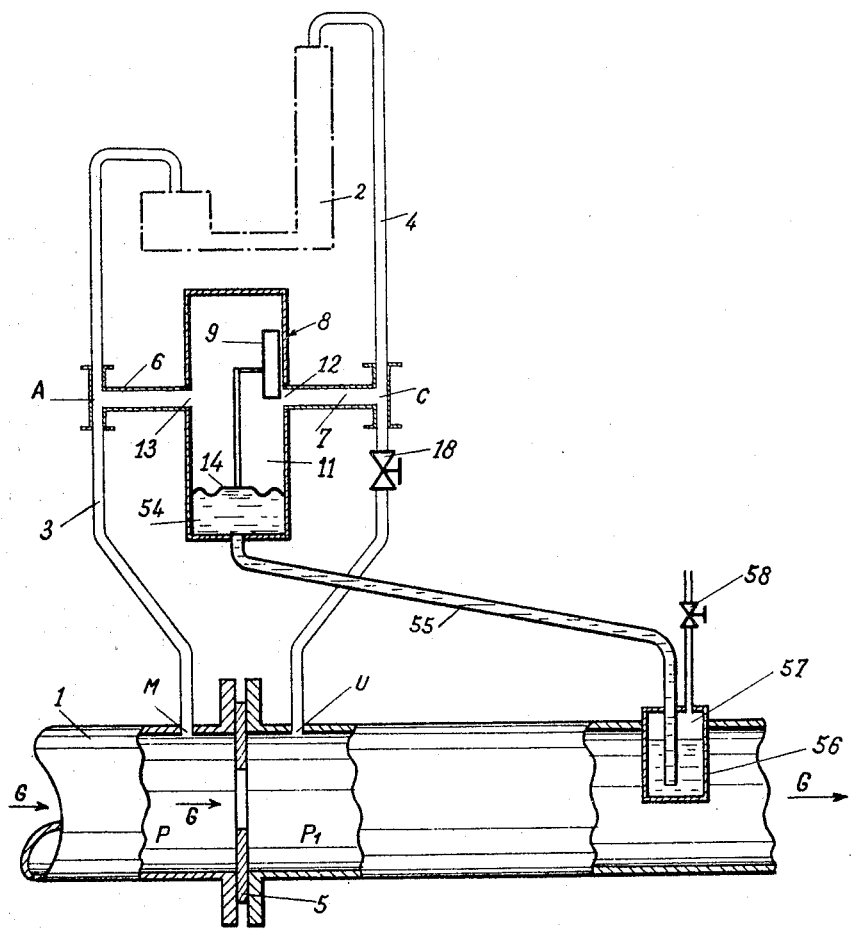
FIG. 8 is a simplified diagram similar to FIG. 1 but showing a second and improved design.

The design according to FIG. 1 is suitable for the frequent case of measuring the flow of gas in a pipe the internal temperature of which remains very close to the surrounding temperature.

FIG. 1 shows such a pipe-line along which is flowing a gas G whose mass-flow is to be measured by a pressure measuring means, represented by 2, of a conventional type, such as a differential pressure-gauge, diaphragm or U-tube liquid-filled (water, mercury, etc.).

Pressure measuring means 2 would normally be connected to pipe-line 1 by two tubes 3 and 4 entering the pipe-line at points M and U respectively upstream and downstream of a restriction 5, such as an orifice-plate which causes a pressure-drop DP in the gas-stream G equal to:

$$DP = P - P_1$$

P and $P_1$ being respectively the higher and lower pressures.

According to the invention a compensating device is provided for use with pressure measuring means 2 and so connected that the differential pressure measured by pressure measuring means 2 shall differ from DP and vary with pressure and temperature conditions.

This compensating device includes a bypass fitted across point A of tube 3 and point C of tube 4, said bypass consisting of an upstream passage 6, a downstream passage 7 and a slide-valve 8 fitted between passages 6 and 7 in sealed relation therewith. Slide-valve 8 which is automatically controlled and constitutes one of the main parts of the compensating device comprises a port 12 for gas communication between upstream passage 6 and downstream passage 7 and a slide-obturator 9 displaceable in front of port 12, and adapted according to its position to cover port 12 more or less thus throttling the flow of gas from passage 6 to passage 7.

The device further comprises a compartment or chamber 11, hereinafter termed chamber 11, in sealed relation with slide-valve 8 and passages 6 and 7. Chamber 11 is limited by a flexible diaphragm 14 which forms one of the walls thereof. Diaphragm 14 and slide-obturator 9 are operatively connected by a rigid linkage 17, the movement of slide-obturator 9 being guided by guide means not shown on FIG. 1. Diaphragm 14 which thus controls the position of slide-obturator 9 also covers a neighboring, sealed chamber 15 into which, however, connection can be made through cock 16. Chamber 15 constitutes the reference chamber above referred to.

The compensating device further includes a fixed manually adjustable throttle 18 fitted on tube 4 between point C as above defined and pipe 1. Throttle 18 can consist of a simple manually operated valve or cock, of such size and design that it forms a restriction in tube 4.

Before the compensator is commissioned chamber 15 is filled with gas at controlled temperature and pressure conditions. In cases where the gas G is in the main pipe does not follow Mariotte's law, the gas filling chamber 15 is identical to G.

Filling conditions are those which provide the lowest specific mass for the gas in chamber 15 i.e., lowest pressure and highest temperature. These conditions correspond to the greatest volume V the reference chamber can develop, and therefore to the greatest area of passage through port 12.

When the compensator is in operation slide-valve 8 allows gas to leak between points A and C through tube 3, passage 6, port 12 controlled by slide-obturator 9 and passage 7. This gas stream then returns along tube 4 to the main pipe-line, passing through throttle-valve 18 which is placed between the points C and U.

In the by-pass thus formed there are thus two successive pressure-drops: the first $DP_8$ at slide-valve 8 and the second $DP_{18}$ at valve 18. If DP is the pressure-drop across orifice 5, it is obvious that $$DP = DP_8 + DP_{18}$$

According to the present invention, the differential pressure measured by the flowmeter is not DP, but $DP_8$, which is the pressure-drop across slide-valve 8. It shall be demonstrated that this arrangement provides a compensation for variations of $m$ due to changes of temperature and/or pressure in the main pipe-line.

If pressure P in pipe-line 1 exceeds the filling pressure of chamber 15, diaphragm 14 being subjected to the upstream pressure in chamber 11, is forced away and compresses the volume of chamber 15, at the same time moving linkage 17 and slide-obturator 9 in a direction to decrease the size of port 12.

The area of the passage through by-pass 6, 7 being reduced, the differential pressure is increased between A and C, i.e., between the two flowmeter connections.

The reading is therefore increased.

On the contrary, a reduction of pressure or an increase in temperature will produce the opposite effect, i.e. a greater opening of port 12, which will reduce the differential pressure between A and C and correspondingly reduce the flow reading in means 2.

The variation of measured pressure $DP_8$ does therefore occur in a direction suitable for compensation.

One of the points of the invention is that movements of diaphragm 14 are proportional to variations of the volume of reference chamber 15, that the filling pressure and the mass of gas (or air) of chamber 15 are selected to suit operating conditions, that the opening of throttle 18 is suitably set, and that the area of port 12 covered or uncovered by slide-obturator 9 varies according to a predetermined law.

The above conditions being fulfilled, the square root of the differential pressure between A and C (i.e., that actually measured by the flowmeter) can be made to be proportional to "mass" flow over the whole range of the compensating action.

As, moreover, the gas sample in chamber 15 is identical to the process gas flowing in the main pipe-line 1, the correction made by the device constituting the invention can be accurate even if the process gas deviates from Mariotte's law.

Hereunder is explained the method for designing the main parts of the compensating device.

$V_0$ being the minimum residual volume of chamber 15 when diaphragm 14 is in the corresponding end position, DV being the additional volume of the chamber when diaphragm 14 is at the other end position corresponding to maximum volume, the total maximum volume of chamber 15 is:

$$V = V_0 + DV$$

Let R be the supercompressibility factor of the process gas, $P_1$ and $P_2$ the two extreme absolute pressures in main pipe-line 1 between which compensation is also required, then:

$$\frac{V_0 + DV}{V_0} = R \times \frac{P_2}{P_1} \times \frac{T_1}{T_2} \qquad (I)$$

This equation allows DV to be found when $V_0$ is known, or conversely.

In practice DV is determined by the practical possibilities of the diaphragm so that Equation I usually allows $V_0$ to be found.

As slide-obturator 9 slides over port 12 it constitutes a screen shutter whose contour S plays an important part in the efficiency of the compensator, for this contour determines the area of port 12 which is uncovered for the passage of the by-pass gas and therefore the law governing the variations of the flow from A to C in relation to fluid pressure and temperature conditions.

This contour could be determined experimentally, by sending controlled flow quantities through main pipe 1 at known pressures and temperatures and correcting the contour of slide abturator 9 at each position over port 12.

However, a method for the mathematical calculation of contour S is given hereunder.

Let $Q_m$ be the mass-flow, $S_5$, $S_8$ and $S_{18}$ the passage areas of orifice 5, slide-valve 8 and throttle 18 respectively ($S_5$ is constant, $S_8$ variable, $S_{18}$ adjustable) $m_1$ the specific mass of the fluid in pipe 1, P the pressure in pipe 1 upstream of orifice S (high pressure) $P_1$ the downstream pressure (low pressure), $P_2$ the pressure downstream of slide-valve 8, and apply the general formula:

$$Q_m = S\sqrt{mDP}$$

to the various sections of the main and the by-pass, eliminating any negligible terms, the following equation is arrived at:

$$Q_m = S_5\sqrt{m_1(1 + S_8^2/S_{18}^2)(P - P_2)}$$

and without the compensator:

$$Q_m = S_5\sqrt{m_1(P - P_1)}$$

and therefore:

$$S_8^2/S_{18}^2 = k\frac{P_0 T}{P T_0} - 1$$

P and T are instantaneous pressure and temperature, $P_0$ and $T_0$ corresponding base values and $k$ a constant.

The introduction of the movements $x$ of slide-obturator 9 caused by the deformation of diaphragm 14 due to the mass of gas contained in reference chamber 15 gives:

$$S_8 = S_{18}\sqrt{k(1 - S_{14} \cdot x/V_0) - 1}$$

$S_{14}$ being the surface of diaphragm 14 and $V_0$ the volume of chamber 15 at temperature $T_0$.

$y = f(x)$ being the equation of the profile of obturator 9, it is obvious that:

$$S_8 = K_0 - \int_0^x y\,dx$$

$K_0$ is a new constant dependent on the shape of port 12.
By differentiation:

$$y = \tfrac{1}{2}(S_{18} \cdot k \cdot S_{14} \cdot x/V_0)(K - 1 - k \cdot S_{14} \cdot x/V_0)^{-1/2}$$

which is of the form:

$$y = b \cdot S_8(a - bx)^{-1/2}$$

which is of the form:

$$y = b \cdot S_{18}(a - bx)^{-1/2}$$

$a$ and $b$ being constants.

It thus appears that the curve S representing the outline of the slide is as shown in FIG. 2 and has an asymptote $W-W$. As, however, this is not a practical possibility, surface $A_1$ of the asymptote (which can be calculated) is filled in and compensated for by cutting away area $A_2$ in front of port 12, areas $A_1$ and $A_2$ being equal.

In FIG. 2 slide-obturator 9 is shown in the full open position, the minimum opening position being shown in composite lines.

In the industrial model built as shown in FIGS. 4 to 7 the automatic slide-valve has a body 22 with opposite passages 6 and 7 bored lengthwise through it and sealed by plugs 26 and 27.

Body 22 is bored transversally by passages 25 and 28 which are tapped at their ends to receive screwed pipe ends 3 and 4.

Slide obturator 9 is a cylindrical rod 23 (FIGS. 4 and 7) whose lower end is cut away, to a curve corresponding to contour S in FIG. 2.

Rod 23 is guided in a cylindrical bore 20 perpendicular to the centre-line of passages 6 and 7, and its end, cut to contour S, moves in front of port 12 which is cut in a partition 30 which separates passages 6 and 7.

Connecting rod 17 which controls slide-obturator 9 enters the body 22 through nipple 31 and reaches through passage 32 inside cover 33, into which also reaches the upper end of slide-valve rod 23.

Rod 17 and slide obturator 9 are connected by bracket 34 which can slide along rod 17 and be locked in any position by screw 35. Bracket 34 has a hole through which passes a threaded rod 37 which is an extension of sliderod 23, rod 37 being locked to bracket 34 by nuts 38.

Diaphragm 14 is placed within a recess machined between a pair of flanges 41, 42 which are held together by bolts and nuts not shown in the drawings.

The diaphragm 14 is pressed between two discs 43 and 44 to which the end of connecting rod 17 is secured.

To lower flange 42 is screwed a T-fitting 45 whose passage on the run connects the underside of diaphragm 14 to chamber 47 inside a removable cap 48. On the outlet passage 49 is the filling cock 16 operated by handle 51.

The reference chamber 15 of FIG. 1 is therefore here materialised by the volume included by the recess in flange 4, passage 46, chamber 47 and outlet passage 49 up to the plug of the cock.

Throttle valve 18 is attached to body 22. This valve consists of a body 52 enclosing a gate 53 whose position can be adjusted by knob 54. Valve 18 is attached to body 22 and, as before, is fitted in tube 4 which leads to the downstream orifice tap.

The above arrangement is thus provided with four adjustments:

Screw 35 allows slide obturator 9 to be adjusted in relation to rod 17 and thus the zero position of the slide in relation to port 12.

Screw 38 can be unlocked and slide-rod 23 rotated about its axis in bore 20 through an angle which will alter the width of the passage between the contour of slide-valve 9 and port 12.

Gate 53 allows adjustment of the throttling action of valve 18.

Lastly, cap 48 can be removed to allow the introduction into chamber 47 and passage 46 of solid metal cylinders to modify the proportion of the volumes of chamber 15 corresponding to the two extreme positions of diaphragm 14 and therefore the range of the compensator, or, conversely, the length of stroke of the piston-slide for a given static pressure variation.

It can be observed that diaphragm 14 is protected against overpressure on either side by the backing-up of one of the discs 43 or 44 against one of the walls of the recesses in flanges 41 and 42.

The device can be calibrated by means of test-rig shown in FIG. 3, which includes, in addition to the manometer 2 shown in FIG. 1 a second manometer 101 connected on both sides between the fluid pipe 1 and the compensator and which measures $P-P_1$ while manometer 2 measures $P-P_2$. Pressure gauge 102 measures the static pressure P when valve 103 is open and the filling pressure of chamber 15 when cock 16 is open.

Valves 104 and 105 can be operated to vary P and $P_1$.

The compensator can be calibrated first at constant temperature, then at a varying temperature. Accuracy can be better than 2%.

In cases where the temperature of the gas in pipe 1 differs from surrounding temperature, it is necessary to use the arrangement shown in FIG. 8.

In this layout diaphragm 14 covers volume 54 which is connected to tube 55 which penetrates into a bulb 56. Bulb 56 is fitted into the main pipe 1, preferably downstream of orifice-plate 5.

Volume 54, tube 55 and part of bulb 56 are filled with a liquid, so that the reference chamber containing a certain mass of the same gas which flows through pipe 1, now consists of the remaining gas-filled volume 57.

In order that the required amount of gas may be introduced into bulb 56 there is provided on the bulb a filling-cock 58 corresponding to cock 16 of FIG. 1.

The filling liquid chosen should be one which will not dissolve the gas in volume 57 and have the lowest possible thermal expansion coefficient.

As before, when the pressure in pipe 1 exceeds the filling pressure of the gas in reference chamber 57, diaphragm 14 forces more of the liquid into this chamber which compresses the gas sample and slide-obturator 9 is drawn downwards increasing the pressure-drop between A and C and reducing the pressure-drop between C and U so that the flow read on means 2 increases with the specific mass.

A reduction of temperature in pipe 1 contracts the gas volume in the reference chamber 57 and produces the same result.

Briefly, in the design described, it has been possible to install the reference chamber inside the pipeline by providing a liquid piston between chambers 54 and 57.

The determination of the working contour of slide-obturator 9 and the method for calibrating the compensator remain as previously described.

Figure 9:
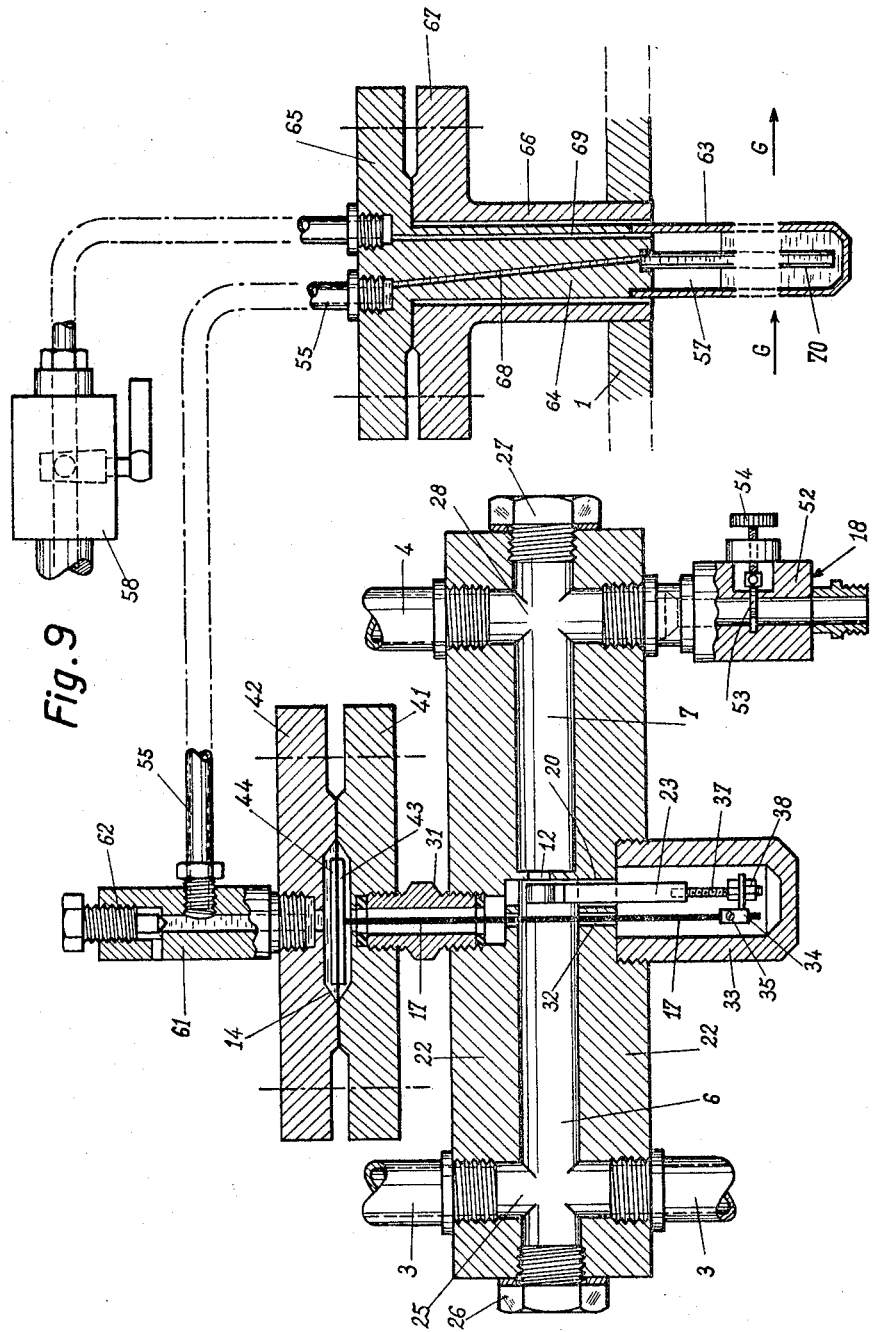
FIG. 9 is a diametral cross-section showing an industrial type of the device built in accordance with FIG. 8.

The actual construction of the invention (FIG. 9) differs little with that of FIG. 4, and the same parts bear the same reference numbers. In the FIG. 9 version, however, the main body of the compensator is turned upside-down for easier filling and flange 42 has a fitting 61 which is provided with a needle-cock 62 for liquid filling. To fitting 61 is connected tube 55.

Bulb 56 is now constituted by a closed tube 63 welded on a stock 64 which has a flange 65 on the other end, and which fits into a nozzle 66 having a flange 67, flanges 65 and 67 being held together by bolts not shown on the drawing.

In stock 64 are drilled two passages 68 and 69. Passage 68 connects tube 55 to tube 70 which extends inside bulb 63. Passage 69 connects reference chamber 57 and gas filling cock 58.

This version of the device is easy to assemble and as bulb 63 is of small volume, it does not seriously perturb the gas flow G in pipe 1.

It is obvious that the invention is not limited to the versions described above and that many practical variations can be introduced.

Thus, slide-obturator 9 can be designed as shown in FIG. 10: a solid piston 71 is rigidly linked to control-rod 17. Piston 71 slides inside a sleeve 72 which is attached to a rod 73 which passes through a packing gland 74 fixed to wall 70 of the chamber enclosing the slide-valve. The upper end 75 of rod 73 is screwed and rod 73 can be adjusted for height by being moved up or down through the centre of gland-bushing 77.

In sleeve 72 a port 78 is cut out to shape S of the working edge of the slide valve.

Port 78 can thus be adjusted for vertical and angular location in relation to body-port 12 and piston-slide 71.

This arrangement provides the possibility of adjusting the compensator during operation even if there is a high static pressure in pipe-line 1.

What I claim is:

1. In a conduit having a pressure-reducing restriction therein and having an upstream passageway means and a downstream passageway means communicating at one end of each with the interior of the conduit on the upstream and downstream sides, respectively, of the restriction and at the other end of each with the inlet and outlet, respectively, of a device for measuring differential fluid pressure as a measure of the rate of flow of fluid in the conduit; the improvement comprising bypass means having a passageway therethrough communicating at opposite ends between said upstream and downstream passageways and having a port in said bypass passageway, an obturator movable across the port to vary the size of the port, a sealed chamber containing a quantity of a reference gas subject to substantially the same temperature and pressure conditions as the fluid flowing in said conduit, one wall of said reference chamber being a flexible diaphragm, and means interconnecting said flexible diaphragm and said obturator for movement in a sense such that movement of the diaphragm upon expansion of the volume of said sealed chamber moves said obturator in a direction to open the port and movement of the diaphragm in the opposite direction moves the obturator in a direction to close the port so that a change in the density of the fluid flowing in said conduit is accompanied by an inverse change in the volume of fluid flowing through said bypass passageway.

2. Apparatus as claimed in claim 1, said interconnecting means comprising means rigidly interconnecting said flexible diaphragm and said obturator.

3. Appraratus as claimed in claim 1, said obturator presenting to said port a non-rectilinear profile which compensates for the unequal relationship between the rate of change of volume of the reference gas and the corresponding rate of change of flow rate of the bypassed fluid.

4. Apparatus as claimed in claim 1, and means for adjusting the distance between the diaphragm and the obturator.

5. Apparatus as claimed in claim 1, said diaphragm being exposed on its side opposite said reference gas to the bypassed fluid.

6. Apparatus as claimed in claim 1, a portion of said sealed chamber being disposed within said conduit.

7. Apparatus as claimed in claim 6, said chamber being partially filled with a liquid, the side of said diaphragm which is inside said reference chamber being in contact with said liquid.

8. Apparatus as claimed in claim 1, and adjustable throttle valve means in said downstream passageway between said bypass passageway and said conduit.

References Cited by the Examiner

UNITED STATES PATENTS

| 2,647,402 | 8/1953 | Ibbott | 73—210 |
| 3,103,119 | 9/1963 | Steele | 73—210 |

FOREIGN PATENTS

| 1,118,983 | 12/1961 | Germany. |
| 59,596 | 7/1947 | Netherlands. |

RICHARD C. QUEISSER, *Primary Examiner.*

EDWARD D. GILHOOLY, *Assistant Examiner.*